Oct. 3, 1961  L. E. SEVISON  3,002,222
DECURLING APPARATUS
Filed June 30, 1958  7 Sheets-Sheet 1
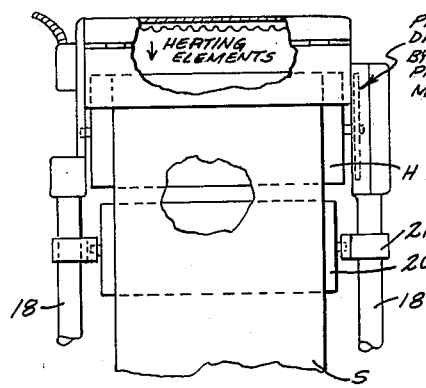
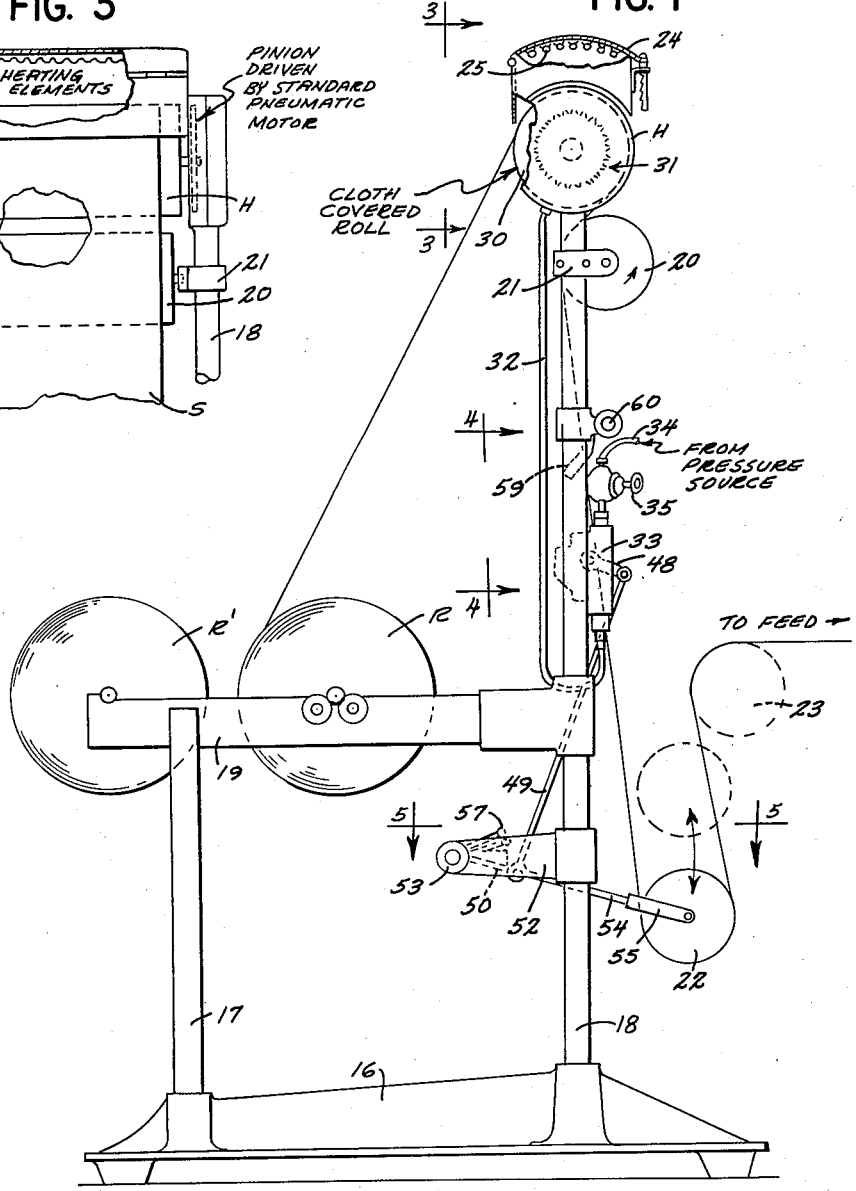
INVENTOR
LUTHER E. SEVISON
BY
Ralph L. Dugger
ATTORNEY Oct. 3, 1961  L. E. SEVISON  3,002,222
DECURLING APPARATUS
Filed June 30, 1958  7 Sheets-Sheet 2

INVENTOR
LUTHER E. SEVISON
BY Ralph L. Klugger
ATTORNEY

Oct. 3, 1961
L. E. SEVISON
3,002,222
DECURLING APPARATUS
Filed June 30, 1958
7 Sheets-Sheet 3
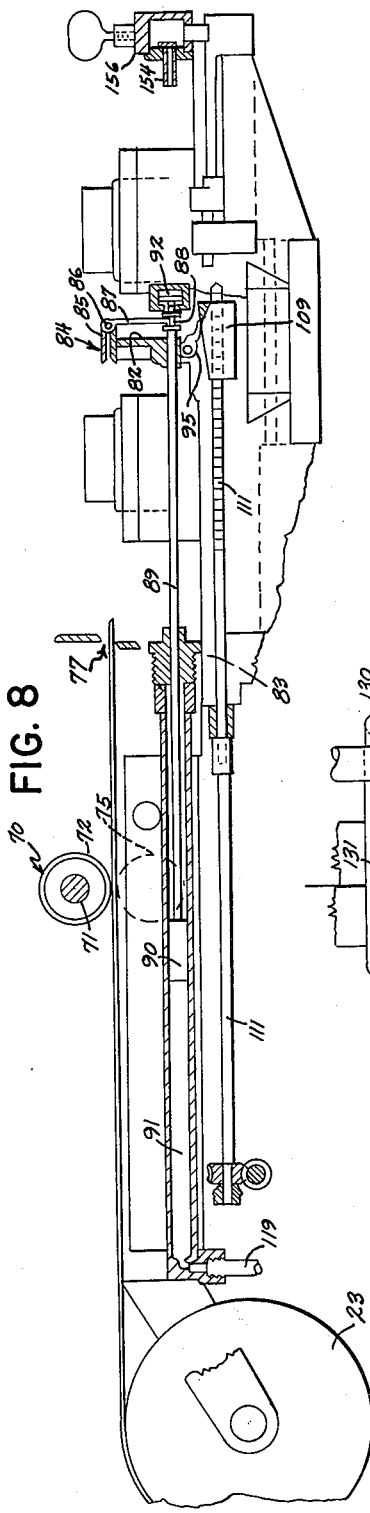
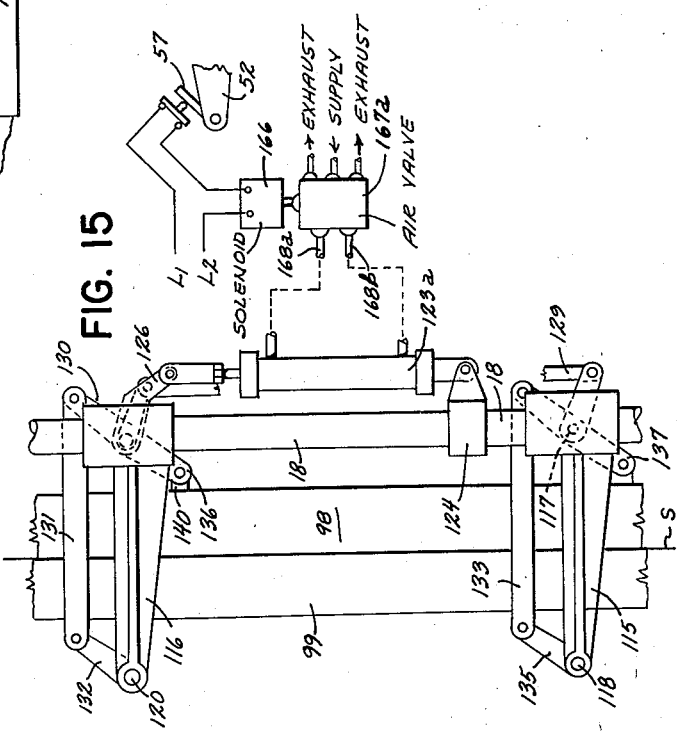
INVENTOR
LUTHER E. SEVISON
BY Ralph L. Wugger
ATTORNEY Oct. 3, 1961  L. E. SEVISON  3,002,222
DECURLING APPARATUS
Filed June 30, 1958  7 Sheets-Sheet 4

INVENTOR
LUTHER E. SEVISON
BY Ralph L. Wugger
ATTORNEY

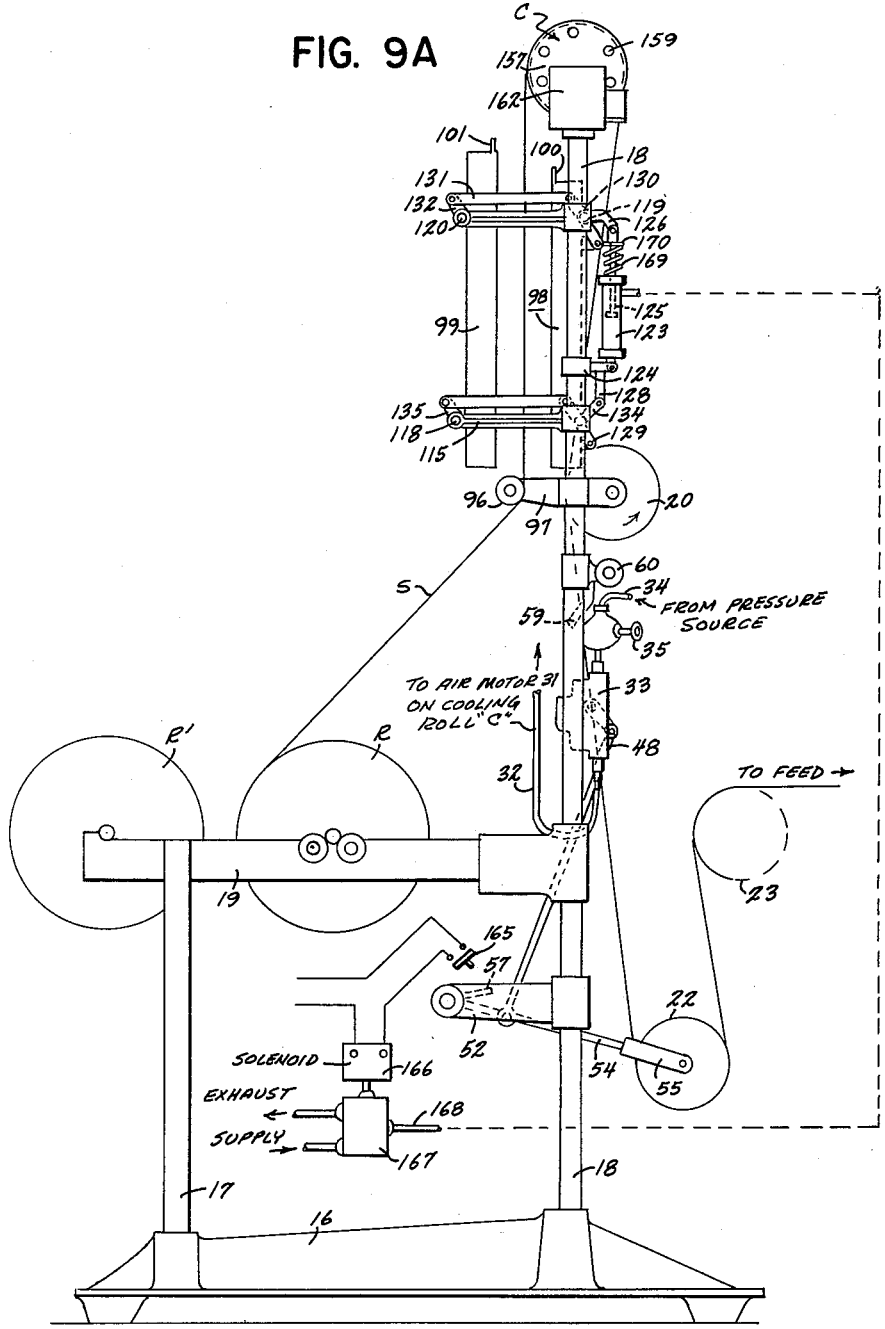

Oct. 3, 1961     L. E. SEVISON     3,002,222
DECURLING APPARATUS
Filed June 30, 1958     7 Sheets-Sheet 6

INVENTOR
LUTHER E. SEVISON
BY
Ralph L. Wugger
ATTORNEY

Oct. 3, 1961 L. E. SEVISON 3,002,222
DECURLING APPARATUS

Filed June 30, 1958 7 Sheets-Sheet 7

INVENTOR
LUTHER E. SEVISON
BY Ralph L. Dugger
ATTORNEY

United States Patent Office 3,002,222
Patented Oct. 3, 1961

3,002,222
DECURLING APPARATUS
Luther E. Sevison, Toledo, Ohio, assignor, by mesne assignments, to Ex-Cell-O Corporation, Detroit, Mich., a corporation of Michigan
Filed June 30, 1958, Ser. No. 745,523
13 Claims. (Cl. 18—1)

This invention relates generally to a device for straightening or decurling a strip of thermoplastic material. The present application is a continuation-in-part of my application Serial Number 265,734, now U.S. Patent No. 2,843,027, filed January 10, 1952.

An object of the instant invention is to decurl thermoplastic material as it is withdrawn in strip form from a supply roll. One exemplary use of the invention resides in the making of thermoplastic boxes where the individual sheets of thermoplastic material cut from a continuous strip should be perfectly flat and free from curls when delivered to the blanking station of the box making machine. By straightening the strip before successively severing same into sheets, the individual sheets can be properly and satisfactorily handled by such a machine.

Other objects and advantages of this invention will hereinafter appear, and for purposes of illustration but not of limitation, an embodiment of the invention is shown on the accompanying drawings, in which—

FIGURE 1 is a side elevation of the decurler mechanism for a plastic sheet;

FIGURE 3 is a fragmentary side elevation, with some parts broken away for purpose of clarity, showing a portion of the decurler and particularly the driving roll and heating elements, taken on the line 3—3 of FIGURE 1;

FIGURE 8 is a fragmentary view, largely in section, showing the incher feed and feeding mechanism for advancing the sheet to the blanking mechanism (not illustrated);

Figure 10:
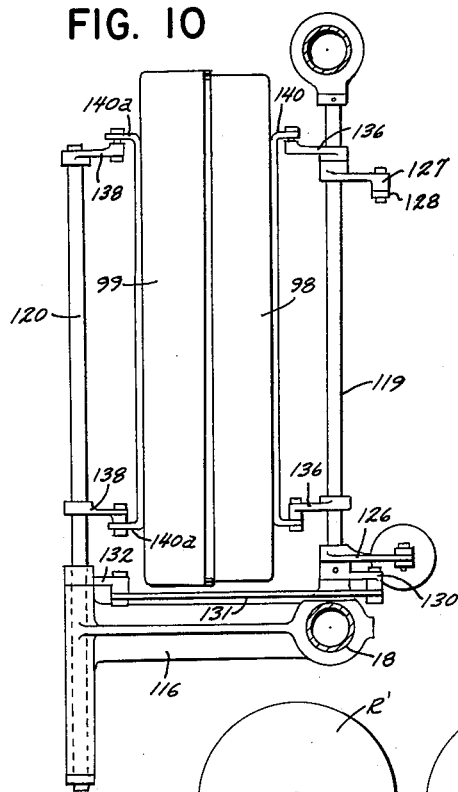
Figure 9:
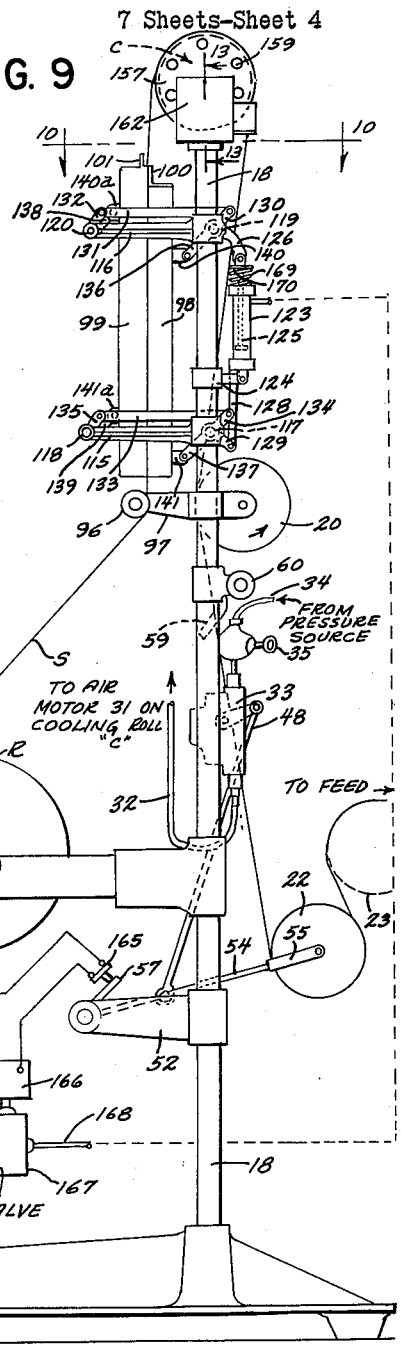
FIGURE 9 is a side evelational view corresponding generally to FIGURE 1 but showing a different embodiment involving both a heating and cooling of the thermoplastic strip.
Figure 11:
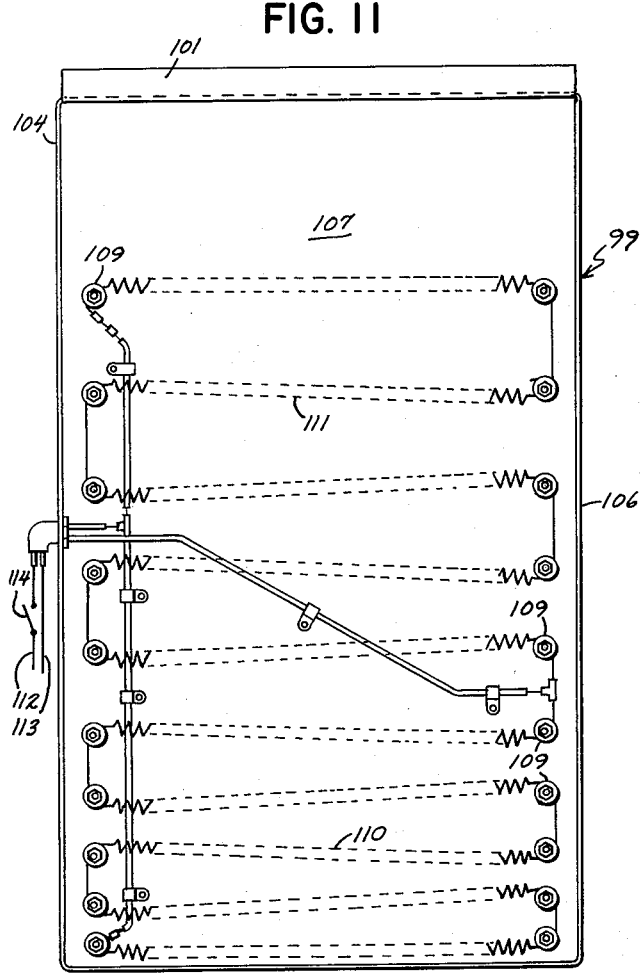
Figure 12:
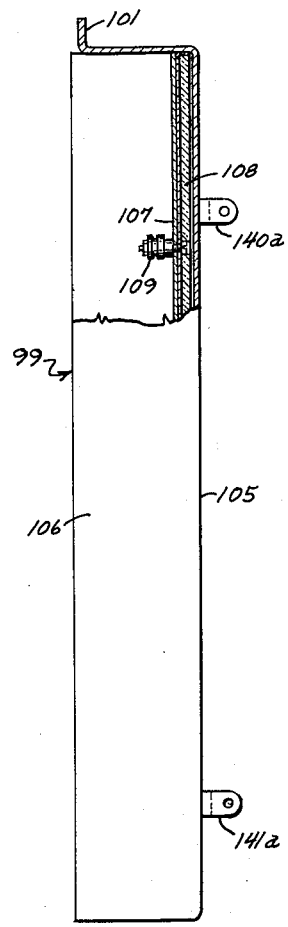
Figure 13:
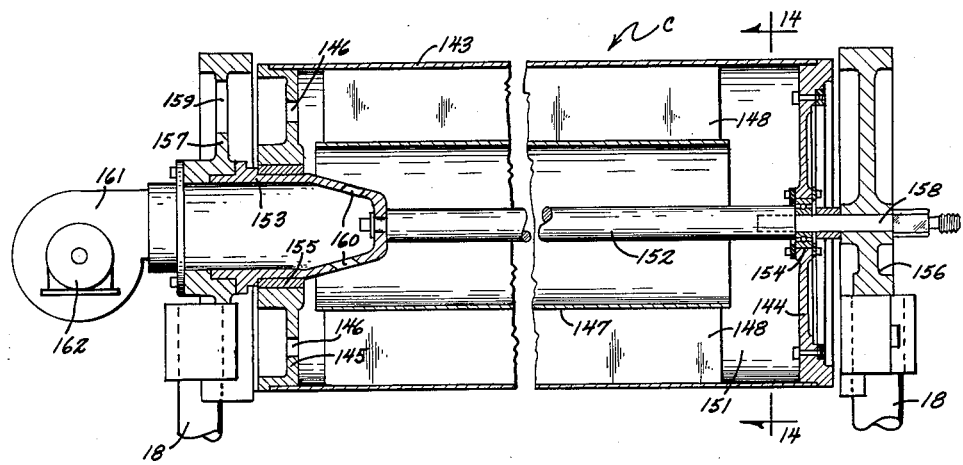
Figure 14:
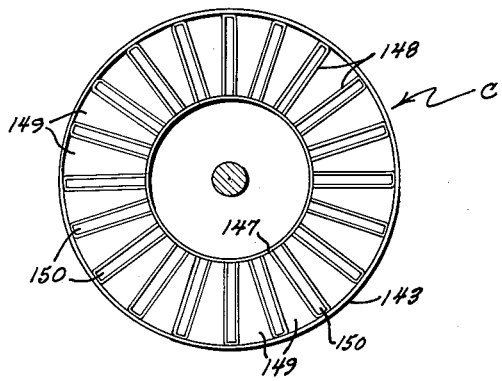

FIGURE 9A corresponds to FIGURE 9 but depicts the apparatus in a non-heating position;

FIGURE 10 is a sectional view taken in the direction of line 10—10 of FIGURE 9;

FIGURE 11 is an outwardly facing front elevational view of one of the heating units depicted in FIGURE 9;

FIGURE 12 is a side elevational view of FIGURE 11;

FIGURE 13 is a sectional view taken in the direction of line 13—13 of FIGURE 9 showing some of the constructional details of the cooling drum;

FIGURE 14 is a sectional view taken in the direction of line 14—14 of FIGURE 13, the view showing further details of the cooling drum, and FIGURE 15 is a fragmentary side elevational view closely resembling FIGURE 9, but showing a slightly modified actuating mechanism for the heating units.

Figure 2:
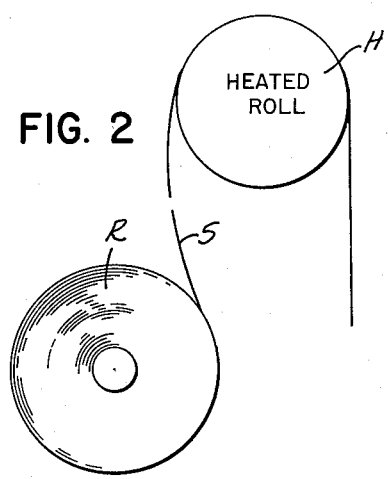
FIGURE 2 is a diagrammatic view showing the thermoplastic sheet material being delivered from a supply roll to the heated roll which forms a part of the decurling mechanism.

Referring to FIGURES 1 and 2, it will be understood that in the exemplary situation the supply roll of plastic sheet material from which the box is formed, has its free end passed over a heated roll H, which is a part of the decurling apparatus which will be more fully explained hereafter. From this continuous strip S of sheet material, a section is severed, that section being of a predetermined size sufficient for blanking operations.

The apparatus for decurling the continuous strip of sheets from a supply roll R comprises a standard, having a base 16 from which rises a pair of laterally spaced posts 17 arranged rearwardly of the base 16. Adjacent to the front end of the base 16 rises a pair of laterally spaced columns 18 of tubular form, which extend vertically a substantial distance beyond the posts 17. Connected to and supported by posts 17 and columns 18 are horizontal supports 19 on which the roll R is suitably mounted for turning movement. As shown, spaced rearwardly of the supply roll R is a reserve roll R' which can be placed in use when the supply roll R is exhausted.

From the supply roll R the strip S extends upwardly and about the heated roll H, thence downwardly and inwardly over a guide roll 20, which is carried by brackets 21 secured to the upper portions of the columns 18. From the guide roll 20 the strip extends downwardly to a floating roll 22. Arranged between the guide roll 20 and the floating roll 22 is a pair of laterally spaced curved guide fingers suitably carried by the columns 18. These fingers engage opposite edge portions of the strip S as the latter advances and are so shaped to trough or cause the edge portions of the strip to be given a reverse curl, lengthwise of the sheet, for the purpose of assisting in straightening out the continuous sheet and to obtain a strip, which is as flat and free from undulations and curls as is possible.

From the floating roll 22 the strip S passes over a guide roll 23 to the feeding mechanism of a box making (not shown) machine. Suffice it to say at this time that the feeding mechanism operates in a step-by-step manner whereby the strip S is pulled for a predetermined distance after which the feed remains quiescent until the next successive pull or advancing movement imparted to the sheet.

Figure 7:
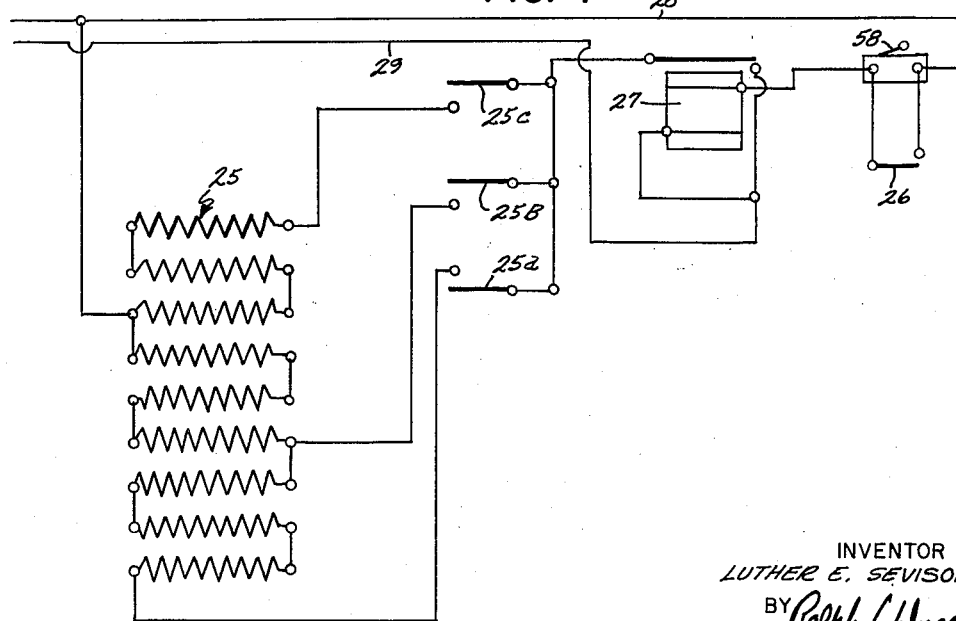
FIGURE 7 is a wiring diagram for the heating elements by which the plastic sheet is heated during the decurling operation.

Spaced above the roll H is a canopy 24 which is arcuate in cross section and carries on its under surface an electrical heater for supplying radiant heat to the strip S as it passes over the roll H. As shown in FIGURE 7, the heater 25 has three sets of heating units 25A, 25B and 25C, these being of varying resistances in order to generate varying degrees of heat in accordance with the demands of service. The particular electrical arrangement forms no part of this invention. Suffice it to say that a main switch 26 is electrically connected to a relay 27 suitably connected through the switches leading to the individual groups of heating coils. Current is supplied from the lines 28 and 29, and by actuating the main switch 26 and one or another of the switches for the respective units 25A, 25B and 25C, the proper or desired radiant heat for the roll H may be readily obtained.

The exterior of the roll H is covered by cloth to provide a relatively soft surface over which the strip S may pass freely without scratching it. The roll H is of substantial size and disposed within the roll and suitably connected for driving it is an air engine 31 of the piston and cylinder type. Since air engines of this type are well known in the art and since the particular construction forms no part of this invention, detailed description thereof is not considered necessary. Air under pressure is supplied to the air engine 31 by a tube 32 which extends downwardly to the lower end of a valve housing 33 suitably clamped to one of the columns 18 about midway of its height. Air under pressure is supplied to the upper end of the valve housing 33 through a tube 34 from a suitable source, a manual valve 35 being disposed adjacent the upper end of the valve housing 33 for controlling the introduction of compressed air to the housing.

Figure 6:
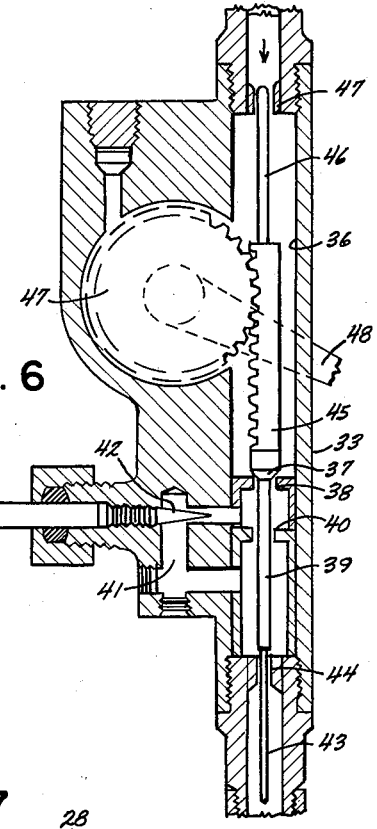
FIGURE 6 is an enlarged vertical sectional view of the line 6—6 of FIGURE 4.
Figure 4:
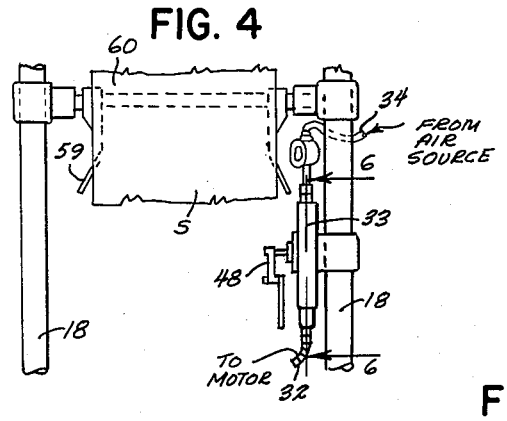
FIGURE 4 is a fragmentary side elevation on the line 4—4 of FIGURE 1.

Referring particularly to FIGURE 6, a passage 36 extends vertically through the housing 33 and arranged within this passage is a poppet type valve 37, which is vertically reciprocable toward and away from a valve seat 38. Connected to the underside of the valve 37 and depending therefrom is a tapered rod 39 constituting a metering valve. The metering valve 39 passes through a sleeve 40 and the further upwardly the metering valve 39 moves relative to the sleeve 40, the greater will be the amount of air which is allowed to pass between the valve and the sleeve 40. A passage 41 connects the portion of the passage 36 above the sleeve 40 with that portion of the passage below the sleeve and a manually operated needle valve 42 controls the passage of air through the passage or bypass 41. Connected to the lower end of the metering valve 39 and depending therefrom is a guide rod 43 which passes loosely through a tubular guide 44. Connected to the upper end of the valve 37 is a rack 45 and at the upper end of the rack 45 extends a vertically disposed rod 46 which passes loosely through a guide 47. Meshing with the teeth of the rack 45 is a pinion 47 which is oscillatably mounted in a cavity formed in the valve housing 33.

Fixed to the pinion shaft on the outside of the housing 33 is an operating arm 48 and pivoted to the free end of the arm 48 is a depending link 49. The lower end of the link 49 is pivoted to an arm 50 which is mounted upon and fixed to a transverse shaft 51. The transverse shaft 51 has its end portions rotatably mounted in transverse bracket arms 52, the inner ends of which are clamped to the upright columns 18. Fixed to the end portion of the shaft 51 is a knurled operating wheel 53 to enable the wheel and shaft 51 and associated parts to be moved by hand, when so desired.

Figure 5:
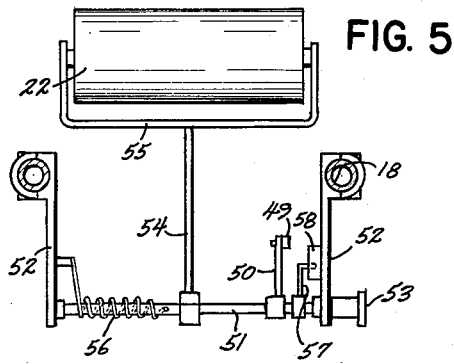
FIGURE 5 is a transverse sectional view on the line 5—5 of FIGURE 1, showing the floating roll and associated parts.

Fixed to an intermediate portion of the shaft 51 is an arm 54 which projects forwardly towards the columns 18 and rigid with its opposite end is a yoke 55 carrying the floating roll 22. In order to counterbalance the weight of the roll 22 and associated parts, a torsional spring 56 has one end fixed to one of the bracket arms 52, is wound about the shaft 51 and has the opposite end fixed to the shaft, as indicated on FIGURE 5.

Fixed to the shaft 51 adjacent to the arm 50 is a relatively short arm 57 which cooperates with a switch 58. When the roll 22 falls downwardly upon release from the strip S, due for example, to breakage of the strip or completion of the supply on the roll R, the limit switch will act to shut off the heater 25. This will appear more fully later on.

As the strip S passes over the heater roll H, the proper degree of heat which is empirically determined is radiated by the heater 25 so that the plastic strip S is rendered more pliable and is in the desired condition for decurling. It will be noticed that the strip as it leaves the heater roll H is directly given a reverse bend as it passes over the guide roll 20 restoring the strip to a substantially flat condition. Since there is a tendency of the side edge portions of the strip to curl, the strip then passes between the guide fingers 59 supported on a transverse rod 60 which create a trough-like effect and is found to eliminate curling difficulties lengthwise of the sheet.

Advancing movement is imparted to the strip S causing it to unwind from the roll R by the operation of the air engine 31. Inasmuch as the subsequent mechanism imparts a step-by-step movement to the strip S and is not in the nature of a continuous uniform feed, it is necessary that the air engine 31 operate at different rates of speed. It will be apparent that the operation of the air engine 31 is controlled by the movement of the floating roll 22 and when a pull is exerted on the strip S by the mechanism in advance of the guide roll 23, the floating roll 22 is caused to swing upwardly, such, for example, as to the broken line position shown in FIGURE 1. When this action takes place, through the connections described, it will be understood that the metering valve 39 (FIGURE 6) is moved vertically upward allowing a greater volume of air under pressure to pass to the air engine. On the other hand, when the floating roll 22 moves downwardly, through the action of the metering valve 39, the volume of air to the air motor 31 is gradually reduced, thereby slowing up the air engine. In the event that the strip should break or for other reasons the floating roll 22 drops to its lowermost position, the valve 37 is then moved to its seat 38, cutting off the flow of compressed air to the air engine. At the same time, the limit switch 58 will be actuated to shut off the operation of the heater. A predetermined amount of compressed air can be bypassed through the bypass 41 on manipulation of the valve 42 for supplementing the volume of air permitted to flow by the metering valve 39.

For imparting recurrent advancing movement to the strip S for a relatively short distance, a feeder or incher 70 is provided and consists of pairs of vertically aligned friction rolls for gripping the strip S therebetween, as shown in FIGURE 8. The incher includes a transverse shaft 71 on which are fixed for rotation a pair of rubber covered rolls 72. A similar shaft-roller-arrangement is disposed beneath the table, the latter roller being identified by the reference numeral 75 on FIGURE 8.

It will be understood that the incher 70 advances the strip of plastic sheet material a short distance sufficient to enable certain gripping elements to engage it and advance it further to the blanking stage, which forms no part of the instant invention and therefore is not herein depicted. After the strip has been advanced a sufficient distance suitable for a blank, that portion is severed from the continuous strip by a cutoff mechanism 77.

Referring particularly to FIGURE 8, it will be understood that after the incher 70 has advanced the continuous strip S of sheet material a short distance beyond the cutoff 77, a reciprocatory feeding device grips the advanced edge of the sheet and pulls it forwardly for a distance suitable for a box blank; thereupon the cutoff operates to sever that section from the continuous strip S. A carriage 82 is adapted to reciprocate horizontally toward and away from the cutoff 77. On the upper portion of the carriage 82 is a notched head 84 adapted to receive the forward free end of the strip therein. As indicated on FIGURE 8, the notched head 84 has an intermediate recess in which a pivoted clamping or gripping plate or finger 85 operates. The clamping or gripping plate 85 is pivotally mounted at 86 at its rearward end and has a depending actuating arm 87, the lower end of which is in the form of a yoke to straddle a spool 88. The spool 88 forms a part of an elongated piston rod 89 which, as shown on FIGURE 8, has a piston 90 at one end mounted for reciprocation within a cylinder 91. At the opposite end of the piston rod 89 is a piston 92 which operates to release the gripping or clamping plate 85.

Considering now the embodiment pictured in FIGURE 9, it may be explained that like parts have been assigned the same reference numerals as used in describing the previous embodiment. At the outset, though, it will be perceived that the strip instead of inclining upwardly as in FIGURE 1, is constrained to follow a vertical path after leaving the roll R by reason of a guide roll 96 carried by brackets 97 extending from the columns 18.

Disposed above the guide roll 96 is a pair of confronting heating units 98 and 99. Generally speaking, the units 98, 99 are duplicates of each other. However, the unit 98 is slightly shorter and is equipped with a heat baffle in the form of an angle member 100. The somewhat larger unit 99 carries at its upper end an upstanding flange 101 for guiding the strip S as it leaves the heating units. The construction of the heating unit 99 is best viewed in FIGURES 11 and 12. As shown in this particular figure, the unit 99, as does the unit 98, comprises a rectangular pan 104 having a bottom 105 and sides 106. A panel 107 is fixedly spaced somewhat from the bottom 105, and the intervening space is filled with heat insulation 108, such as fiberglass. Suitably anchored porcelain buttons 109 support the actual electric heating elements 110 and 111 in the form of coiled resistance wire. As will become clearer as the description progresses, the heating elements 110 and 111 of each unit 98, 99 are normally left energized. Consequently, the circuit of FIGURE 7 is not employed; instead the elements are connected to a pair of supply lines 112, 113 corresponding to the previously mentioned lines 28, 29 through the agency of a manually actuatable switch 114 that normally remains closed.

The heating units 98, 99 are mounted so as to be retracted or separated from the strip S. Accordingly, a lower bracket 115 is fixedly supported by one of the columns 18 at one elevation, and a similar bracket 116 is attached to said column an an upper elevation. The lower bracket 115 supports a pair of horizontal parallel shafts 117 and 118, whereas the upper bracket 116 supports a pair of shafts 119 and 120.

The mechanism for rocking the shafts 117, 118, 119 and 120 and thereby operating the heating units 98, 99 will now be described. In achieving their aim, an air cylinder 123 has its closed end pivotally supported to a bracket 124 on one of the columns 18. Contained within the air cylinder 123 is a projecting piston rod 125 that is pivotally connected to an actuating arm 126 keyed to the shaft 119. While this accounts for the rotation or rocking of the shaft 119, it is necessary to rotate the lower shaft 117 in unison with said shaft 119. To do this a take-off arm 127 has articulatively attached thereto a connecting link 128 extending downwardly to an actuating arm 129 on the shaft 117. To rotate or rock the upper shaft 120, a horizontal link 131 extends between one end of an arm 130 on the shaft 119 and an arm 132 on the shaft 120. Similarly, a horizontal link 133 extends between one end of an arm 134 on the lower shaft 117 and an arm 135 on the shaft 118.

The physical withdrawal of the heating units 98, 99 is achieved by way of arms 136, 137, 138 and 139, each numeral denoting a pair of such arms. The arms 136, mounted on the shaft 119, are pivotally connected to laterally spaced ears 140 carried by the heating unit 98, whereas the arms 137, mounted on the shaft 117, are pivotally connected to laterally spaced ears 141 also mounted on this heating unit. The arms 138 are in similar fashion pivotally connected to a pair of ears 140a on the heating unit 99 and the arms 139 are connected to a pair of ears 141a also located on this unit. In this way, upward movement of the piston rod 125 effects simultaneous separation of both of the heating units 98, 99. Later on the manner in which compressed air is supplied to the cylinder 123 will be presented.

Rotatably supported at the top of the columns 18 is a cooling drum or roll C, depicted in detail in FIGURES 13 and 14. As can be discerned from FIGURE 13, the cooling roll C comprises an outer cylindrical tube 143 having an imperforate end plate 144 at one end and a perforated end plate 145 at its other end, the latter having a series of angularly spaced perforations or apertures 146 through which cooling air furnished to this roll C can exit.

Concentrically disposed within the outer tube 143 is a somewhat shorter inner tube 147. The concentricity is maintained by means of a plurality of U-shaped spoke fins 148 (see FIGURE 14) having their bight portions welded to the outer tube 143 and their leg portions welded to the inner tube 147. These spoke fins 148 provide a number of parallel passages 149, 150. Since the inner tube 147 and the fins 148 are shorter than the outer tube 143, an end chamber 151 is formed, this chamber providing communication between the bore of the inner tube 147 and the various passages 149, 150.

A cooling roll shaft 152 extends axially through the inner tube 147, being anchored at one end to the end plate 144 and at its other end to a shaft bracket 153. The shaft is not intended to rotate, the cooling roll instead being designed to rotate about the shaft by reason of a ball bearing assembly 154 contained in the end plate 144 and a needle bearing assembly 155 contained in the end plate 145. A frame member 156 is mounted at the upper end of one of the columns 18 and a frame member 157 is mounted atop the other column 18. The frame member 156 journals a stub staft 158 splined at its free end for coupling to an air engine such as the air engine 31 that has been perviously alluded to. Since the stub shaft 158 is mechanically connected to the end plate 144, it can be appreciated that the cooling roll C will be rotated when the engine 31 is operated. The frame member 157 fixedly supports the bracket 153, the end plate 146 being free to rotate with respect thereto by reason of the bearing assembly 155. It will be observed that the frame member 157 contains a plurality of apertures 159 permitting free escape of the air exiting through the discharge apertures 146.

The cooling air is introduced into the cooling roll C via the shaft bracket 153, this bracket being of hollow construction and provided with a plurality of entrance apertures 160. A blower 161, powered by a suitable motor 162, furnishes the cooling air to the bracket 153 for passage through the cooling roll C.

From the description that has been given up to this point it is believed apparent that the cooling roll C is intended to not only cool the strip S after heating thereof by the heater units 98, 99 but that it is also intended to withdraw plastic material from the supply roll R. As to this latter role, the cooling roll C functions in much the same capacity as the heating roll H of the earlier-described embodiment. Accordingly, air under pressure is supplied to the air engine 31 through the valve housing 33 and the tube 32, the valve 33 being controlled by the floating roll 22, as has already been described in conjunction with said earlier-described embodiment.

What has not as yet been explained is how air is furnished to the cylinder 123 to effect a bringing together of the separable heating units 98, 99 from the position shown in FIGURE 9A to their normal operating position pictured in FIGURE 9. In the present arrangement, the relatively short arm 57 is utilized to actuate a switch 165 in circuit with a solenoid 166. The solenoid 166, when energized permits air under pressure to flow through an air valve 167 to the upper end of the air cylinder 123 via a tube 168. Air so supplied to the air cylinder 123 will cause its piston rod 125 to be urged downwardly, thereby rocking the shaft 119, and indirectly the other shafts 117, 118 and 120, in a direction to move the heating units 98, 99 toward each other into the position illustrated in FIGURE 9. Such action occurs when the floating roll 22 is in its upper position, as shown in FIGURE 9, the switch 165 being oriented with respect to the arm 57 so that it is closed when the arm is rotated in a counter-clockwise direction as viewed in FIGURE 9. In other words, provision is made for urging the heater units 98, 99 together when the system is functioning properly. Should the strip S break or for some other reason drop to its lower solid line position, as presented in FIGURE 9A, the switch 165 is opened, and the solenoid 166 thereby deenergized, to close the valve 167 with the consequence that air to the cylinder 123 is cut off and that air in the tube 168 is exhausted through the exhaust port of said valve 167.

In the specific arrangement set forth in FIGURES 9 and 9A, it is planned that the heater units 98, 99 be spring actuated to their separated position when no air is applied to the cylinder 123. Therefore, the air cylinder 123 is equipped with a coil spring 169 interposed between the upper end of the air cylinder 123 and a plate or washer 170 carried by the projecting end of the piston rod 125. It can be readily seen, it is believed, that when no compressed air is furnished to the cylinder 123, the spring 169, which is compressed when the heater units 98, 99 are together, expands, thereby urging or pushing the piston rod 125 upwardly as viewed in FIGURE 9A.

Through the agency of the spring 169 the heater units 98, 99 are immediately retracted, i.e. separated from each other, should there be either an electrical or pneumatic failure. This is the position shown in FIGURE 9A. Stated somewhat more specifically, should electric power to the solenoid 166 be lost, air will be bled from the cylinder 123 via the now shut off air valve 167 and the spring 169 will push the piston rod 125 upwardly to separate the heater units 98, 99. By the same token, should the supply of compressed air to the air valve 167 be lost, the spring 169 will immediately expand to accomplish the same end result, that being to effect separation of the heater units 98, 99 from their proximal relationship with the thermoplastic strip S. In other words, the heater units 98, 99 move from the position in FIGURE 9 to the position in FIGURE 9A.

While it is felt that the preceding spring arrangement will be the preferred one in a number of instances, nonetheless the invention also envisions a completely pneumatic operation of the air cylinder 123. Attention is, therefore, directed to the fragmentary view set forth in FIGURE 15. The same solenoid 166 is used, but a modified air valve 167a is employed. In this situation, two tubes 168a, 168b lead from the air valve 167a to opposite ends of a cylinder 123a. During normal operation the energization of the solenoid 166 will furnish air under pressure to the upper end of the cylinder 123a via tube 168a and the piston rod 125 will be forced downwardly just as in the previous spring embodiment. When the solenoid 166 is deenergized, though, compressed air is instead supplied via the tube 168b thereby to force the piston rod 125 upwardly with a concomitant separation or retraction of the heater units 98, 99. Thus, in this somewhat modified version the air cylinder 123a is double acting depending upon whether air is fed to the lower or upper end thereof.

In summary, the embodiment of FIGURE 1 adds heat to the thermoplastic strip S by way of the heater 25 and roll H, the heat being cut off during any stoppage of the strip's travel. In some situations, especially where the strip S is of relatively thin gauge, the residual heat is objectionable. Also, there is somewhat of a lag when the system is restarted, since the heater 25 is not instantaneous in coming back up to the desirable temperature. When such difficulties are experienced, consideration will be given to the modified installation of FIGURES 9 and 15.

In the embodiments set forth in FIGURES 9 and 15, the heating units 98, 99 remain energized during work stoppages, but are moved apart so as not to endanger the strip S. By so doing, the heat is immediately reapplied to the strip when feeding of said strip is resumed. Also, the residual heat problem is obviated. Further, the cooling action furnished by the roll C assists in the decurling achievement because the strip S is quite taut when passing thereover.

It is to be understood that numerous changes may be effected in details of construction, arrangement, operation and choice of materials without departing from the spirit of the invention, especially as defined in the appended claims.

What is claimed is:
1. A decurling device for a continuous length of plastic sheet material comprising a heater, a roll for advancing the sheet past the heater, means for driving the roll, feed means operable intermittently to pull the sheet forwardly, a floating roll about which the sheet passes and adapted to rise and fall according to the action of the feed means, and means responsive to the rising and falling movement of said floating roll for controlling said driving means.

2. A decurling device as claimed in claim 1 in which said driving means includes a pneumatic engine and said responsive means includes valve means controlling the air supply to said engine in accordance with the rising and falling movement of said floating roll thereby to accelerate or decelerate the engine speed.

3. A decurling device as claimed in claim 2, comprising a pivotally mounted lever for said floating roll, and said valve means comprising a longitudinally shiftable metering device for increasing or decreasing the volume of air supplied to the engine according to the position of said lever.

4. A decurling device as claimed in claim 3, comprising a by-pass associated with said metering device, and a manual valve for controlling the air flow through the by-pass thereby to afford manual control for the engine speed.

5. A decurling device as claimed in claim 4, in which the heater comprises an electrical device, and a switch for rendering the electrical device inoperative upon breaking the continuity of the sheet.

6. A decurling device as claimed in claim 4 in which said heater is retractable relative to said sheet material, and means for retracting said heater upon breaking the continuity of the sheet.

7. A decurling device for a continuous length of plastic sheet material comprising a pair of retractably mounted heater units, means to advance the sheet between said heater units, automatic means for regulating the operation of said advancing means in response to the demands of service, an air cylinder for urging said heater units toward said sheet, and automatic means for rendering said advancing means ineffective in the event of breaking the continuity of the sheet, said last-mentioned means also causing said air cylinder to retract said heater units.

8. A decurling device as claimed in claim 7 in which the advancing means includes a cooling roll about which said sheet passes after heating thereof by said heater units.

9. A decurling device as claimed in claim 8 in which the advancing means further includes a pneumatic engine for driving the cooling roll, valve means for controlling the air supply to said engine, feed means operable intermittently to pull the sheet forwardly, a floating roll about which the sheet passes and adapted to rise and fall according to the action of the feed means, and an operative connection between said floating roll and valve means for actuating the latter in response to the position of the floating roll thereby to accelerate or decelerate the engine speed.

10. A decurling device for a continuous length of plastic sheet material comprising a pair of retractably mounted, vertically disposed heater units, a cooling roll above said heater units about which the heated material passes to be thereafter directed downwardly, a floating roll under which said material passes after cooling thereof, means controlled by said floating roll for actuating said heater units between a position in proximal relationship to the adjacent sheet material and a position in a more substantially spaced relationship to the adjacent sheet material than the first mentioned position and additional means controlled by said floating roll for determining the rotative speed of said cooling roll.

11. A decurling device as claimed in claim 10 including feed means operable intermittently to pull the sheet forwardly after passing about said floating roll.

12. A decurling device for a continuous length of plastic sheet comprising means for holding a source of supply of sheet material, a heater unit, means for advancing said sheet material past the heater unit, means for sensing the tension in said sheet material after it has passed the advancing means, and means responsive to said tension means for controlling the speed of said advancing means.

13. The apparatus of claim 12 further characterized in that the control means includes automatic means for controlling the output of heat from said heater unit, said automatic means operative to turn off the heater upon the stopping of said advancing means.

References Cited in the file of this patent

UNITED STATES PATENTS

| | | |
|---|---|---|
| 2,320,115 | Young | May 25, 1943 |
| 2,420,399 | New | May 13, 1947 |
| 2,551,966 | Pierce | May 8, 1951 |
| 2,576,317 | Toulmin | Nov. 27, 1951 |
| 2,679,088 | Meherg et al. | May 25, 1954 |
| 2,753,592 | Cochran | July 10, 1956 |

OTHER REFERENCES

"Heating With Far Infra-Red" (Perrotta), published in Modern Plastics, August 1953, pages 109–115.